(12) United States Patent
Helander

(10) Patent No.: US 11,905,984 B2
(45) Date of Patent: Feb. 20, 2024

(54) MOUNTING BRACKET

(71) Applicant: Joya Helander, Lyme, CT (US)

(72) Inventor: Joya Helander, Lyme, CT (US)

(*) Notice: Subject to any disclaimer, the term of this patent is extended or adjusted under 35 U.S.C. 154(b) by 0 days.

(21) Appl. No.: 17/830,882

(22) Filed: Jun. 2, 2022

(65) Prior Publication Data
US 2023/0392624 A1 Dec. 7, 2023

(51) Int. Cl.
*F16B 2/24* (2006.01)
*A47L 13/512* (2006.01)

(52) U.S. Cl.
CPC ............ *F16B 2/245* (2013.01); *A47L 13/512* (2013.01)

(58) Field of Classification Search
CPC ......... A47L 13/512; B44C 5/02; F16B 2/245; F16B 5/02; Y10T 24/44017; Y10T 24/44368; Y10T 24/44376
USPC ....... 248/113, 316.7, 316.2, 300, 110, 316.3; 24/3.11; 211/60.1, 63–64, 68, 70.2, 70.5, 211/70.8
See application file for complete search history.

(56) References Cited

U.S. PATENT DOCUMENTS

| | | | | |
|---|---|---|---|---|
| 116,140 A * | 6/1871 | Beardsley | ........... | A47L 13/512 248/113 |
| 157,263 A * | 11/1874 | Yinger | ............ | A47L 13/512 248/113 |
| 198,714 A * | 12/1877 | Uibel | ............ | A47L 13/512 248/113 |
| 307,761 A * | 11/1884 | Harger | ........... | A47L 13/512 248/113 |
| 482,531 A * | 9/1892 | Skanks | ........... | F16M 13/00 248/316.1 |
| 515,817 A * | 3/1894 | Burbank | ........... | A47L 13/512 248/113 |
| 572,770 A * | 12/1896 | Putnam | ........... | B62H 3/12 248/312 |
| 994,790 A * | 6/1911 | Richards | ........... | A47L 13/512 248/113 |
| D42,833 S * | 7/1912 | Carlsson | ........... | 248/113 |
| 1,117,491 A * | 11/1914 | Hornung | ........... | A47G 25/12 248/113 |
| 1,174,185 A * | 3/1916 | Scott | ........... | A63D 15/10 211/68 |

(Continued)

OTHER PUBLICATIONS

How to Properly Mount a TV to a Wall: Step by Step; Jonah Matthes; Mar. 22, 2020; https://www.youtube.com/watch?v=HEvTRTAeKkk (Year: 2020).*

(Continued)

*Primary Examiner* — Ingrid M Weinhold
(74) *Attorney, Agent, or Firm* — Murtha Cullina LLP (57) ABSTRACT

The mounting bracket includes a body that has a first end, a second end opposite the first end, and a first mounting hole that passes through the body and is located between the first end and the second end. A first resilient wing is located at the first end of the body. A second resilient wing is located at the second end of the body. A tab protrudes from a first edge of the body. The tab is located between the first end of the body and the second end of the body. A second mounting hole passes through the tab. The first resilient wing and the second resilient wing each extend upward from the body and are biased toward each other such that the first resilient wing and the second resilient wing are configured to grip and secure an object to the mounting bracket.

20 Claims, 8 Drawing Sheets

(56) References Cited

U.S. PATENT DOCUMENTS

| | | | | |
|---|---|---|---|---|
| 1,486,762 | A | * | 3/1924 | Jones ............... A47L 13/512 248/113 |
| 1,552,252 | A | * | 9/1925 | Webb ............... A47L 13/512 248/113 |
| 1,666,045 | A | * | 4/1928 | Ganny ............... A47L 13/512 248/113 |
| 1,798,028 | A | * | 3/1931 | Nachtigal ............ A47L 13/512 248/113 |
| 1,911,781 | A | * | 5/1933 | Wolfe, Jr. ............ A47L 13/512 248/113 |
| 1,925,767 | A | * | 9/1933 | Mallory ............... A47L 13/512 248/113 |
| 1,968,462 | A | * | 7/1934 | Merhell ............... A47L 13/512 248/113 |
| 2,262,873 | A | * | 11/1941 | Wise ............... G09F 7/18 40/607.14 |
| 2,795,834 | A | * | 6/1957 | Szoke ............... A47G 29/08 248/113 |
| 3,273,769 | A | * | 9/1966 | Miller ............... B60R 7/12 224/546 |
| 4,063,647 | A | * | 12/1977 | Blackmore ............ B62H 3/12 248/316.7 |
| 4,136,848 | A | * | 1/1979 | McCollum ............ A01K 97/08 248/362 |
| 4,848,714 | A | * | 7/1989 | Ziaylek, Jr. ............ A62C 13/78 248/313 |
| 4,958,792 | A | * | 9/1990 | Rinderer ............... F16L 3/13 24/457 |
| 5,121,894 | A | * | 6/1992 | Twork, Sr. ............ F16L 3/13 248/74.2 |
| 2002/0130237 | A1 | * | 9/2002 | Kluser ............... F16L 3/13 248/316.1 |
| 2009/0165319 | A1 | * | 7/2009 | Gallien ............... A47G 1/205 33/666 |

OTHER PUBLICATIONS

Laofeei; Mar. 12, 2022; https://www.amazon.com/Holder-Organizer-Hanger-bathroom-kitchen/dp/B09PK6VX31/ref=sr_1_1?keywords=laofeei&qid=1686171913&sr=8-1&th=1 (Year: 2022).*

Coofel; Apr. 9, 2019; https://www.amazon.com/Broom-Holder-Mount-Organizer-Hanger/dp/B07QFTS7YS/ref=sr_1_7?crid=3MLKRGR1PT9B0&keywords=Coofel&qid=1686171998&s=hi&sprefix=coofel%2Ctools%2C93&sr=1-7 (Year: 2019).*

Shed Antler Display Straps; Strapatine; Apr. 6, 2013; https://www.youtube.com/watch?v=zfbqHF4S981 (Year: 2013).*

Home Depot, Printed Sep. 13, 2022, Shed bed wall mount, https://www.homedepot.com/p/Unger-28-25-in-x-2-25-x-2-75-in-Hang-Up-Storage-Unit-964770/202562869#overlay.

Amazon, Printed Sep. 13, 2022, Shed bed wall mount, https://www.amazon.com/Shed-Bed-Mounted-Antleritis-7051/dp/B01B1XYED8.

Cabela's, Printed Sep. 13, 2022, hMounting Mike's Antler Mount Kit, ttps://www.cabelas.com/shop/en/mountain-mikes-reproductions-black-forest-mounting-antler-plaque?ds_e=GOOGLE&ds_c=Cabelas%7CShopping%7CSmart%7CHunting%7CHunting%7CNAud%7CTopPerf%7CNMT&gclid=EAIaIQobChMl2pzGwrGF-QIVguazCh157w0LEAQYASABEgJoKfD_BwE&gclsrc=aw.ds.

Rack Hub, Printed Sep. 13, 2022, Rack/Hub mounting products, https://www.rack-hub.com/?gclid=EAIaIQobChMlvL6067GF-QIV2vvjBx0d6AaJEAAYASAAEgKanvD_BwE.

Amazon, Printed Sep. 13, 2022, Rack Shack Shed Display, https://www.amazon.com/RACK-TRACK-Shed-Antler-Mounting/dp/B08GLFGPS6.

Etsy, Printed Sep. 13, 2022, Mega Invisible Wall Mount, https://www.etsy.com/listing/885434563/mega-invisible-wall-mount?gpla=1&gao=1&&utm_source=google&utm_medium=cpc&utm_campaign=shopping_us_d-home_and_living-home_decor-taxidermy_and_curiosities bones_and_skulls&utm_custom1=_k_EAIaIQobChMlwduNjrGF-QIV-8mUCROiPQnNEAQYASABEgFLwfD_BwE_k_&utm_content=go_12573358013_118181049063_507897029222_aud-318222619806:pla-306097971099_c_885434563_566827167&utm_custom2=12573358013&gclid=EAIaIQobChMlwduNjrGF-QIV-8mUCROiPQnNEAQYASABEgLFwfD_BwE.

Etsy, Printed Sep. 13, 2022, Thule Design Shed Antler Mounting Clamp, https://www.etsy.com/listing/681541286/shed-antler-mounting-clamp?gpla=1&&utm_source=google&utm_medium=cpc&utm_campaign=shopoping_us_c-home_and_living-home_decor-taxidermy_and_curiosities-animal_mounts&utm_custom1=_k_EAIaIQobchMlu7GerrGF-QlVErflCh3FMAfTEAQYA5ABEgKnbvD_BwE_k_&utm_content=go_12573354887_118348197534_507897028754_aud-318222619806:pla-308512752438_c__681541286_564929410&utm_custom2=12573354887&gclid=EAIaIQobChMlu7GerrGF-QlVErflCh3FMAfTEAQYASABEgKnbvD_BwE.

Etsy, Printed Sep. 13, 2022, Thull Design Elk Shed Mounting Clamp, http://www.etsy.com/listing/1032967666/elk-shed-mounting-clamp?gpla=1&gao=1&&utm_source=google&utm_medium=cpc&utm_campaign=shopping_us_b-home_and_living-home_decor-texidermy_and_curiosities-animal_mounts&utm_custom1=_k_EAIaIQobChMls92d2LGF-QlV2vbjBx3qTAPqEAQYCSABEgINNvD_BwE_k_&utm_content=go_12573080350_122093263880_507799052538_aud-318110574626:pla-308512752438_c__1032967666_564929410&utm_custom2=12573080350&gclid=EAIaIQobChMls92d2lGF-QlV2vbjBx3qEAQYCSABEgINNvD_BwE.

* cited by examiner

MOUNTING BRACKET

FIELD

The present technology generally relates to the area of object mounting brackets, and more particularly, to mounting brackets for mounting objects, such as animal antlers, to surfaces or structures such as walls.

BACKGROUND

Many objects such as plates, art, and household objects such as brooms, mops, dustpans, shovels, and ladders, are mounted to structures such as walls or other structures. Many users desire to mount such objects in a manner that does not damage the object and also facilitates easy removal of the object from the structure.

Across the United States and Canada, hundreds of thousands of hunters and outdoorsmen scour the woods between the months of Jan. and Mar. in search of shed deer antlers that fall off the animals' heads once the mating season ends in late Dec.. It has become a sport where adventurers walk hundreds of miles every year trying to find as many antlers as possible. Over the years, shed hunters accumulate dozens, even hundreds, of shed deer antlers that end up in buckets, covering coffee tables, counters, and practically every surface in a home, or roughly screwed to a wall in a Do-It-Yourself attempt to display the antlers.

Recently, there have been attempts to address the problem of displaying these shed antlers on a wall. However, the products developed to-date fail to meet the desires of most shed hunters. Many existing antler display products require drilling into the antler to hold it in place on the wall. This creates two problems. First, most collectors do not want to damage their antlers. Second, most collectors want to be able to easily take down and handle their antlers so they can admire them and show people. The products that require drilling into antlers require them to be permanently attached to a wall or surface so they cannot be removed without further damaging the antlers.

Although some antler display products do not require drilling or damaging the antler, and can allow them to be removed, these products are ineffective because they do not allow the antler to be displayed the way that it sits on a deer's head. Most shed hunters want their antlers to be displayed in the same angle and orientation that they sat on the deer. For example, there is a small shelf design for the antler to sit on. The shelf does not grip or squeeze the antler to hold it and does not allow the antler to be displayed in different angles.

Additionally, other products for displaying deer antlers are often unsightly, or cover up part of the antler. For example, there is a hose clamp design in which the hose clamp wraps around the front of the main beam, covering it up. However, most collectors want to display the antler without concealing any part of the antler. Also, many of these hose clamp designs are metallic or black, which are a sharp, ugly contrast to the natural colors of antlers.

What is needed, therefore, is an improved animal antler mounting bracket that addresses at least the problems described above.

SUMMARY

According to an embodiment of the present technology, a mounting bracket is provided. The mounting bracket includes a body that has a first end, a second end opposite the first end, and a first mounting hole that passes through the body and is located between the first end and the second end. A first resilient wing is located at the first end of the body. A second resilient wing is located at the second end of the body. A tab protrudes from a first edge of the body. The tab is located between the first end of the body and the second end of the body. A second mounting hole passes through the tab. The first resilient wing and the second resilient wing each extend upward from the body and are biased toward each other such that the first resilient wing and the second resilient wing are configured to grip and secure an object to the mounting bracket.

In some embodiments, the first mounting hole is centrally located in the body.

In some embodiments, the second mounting hole is centrally located between the first end of the body and the second end of the body.

In some embodiments, the first mounting hole and the second mounting hole are aligned along a longitudinal axis of the body.

In some embodiments, each of the first resilient wing and the second resilient wing includes a base, a first prong extending from a first edge of the base, a second prong extending from a second edge of the base, an axle secured to the first prong and the second prong, and a roller supported by the axle. The first prong and the second prong oppose each other forming a gap therebetween. The axle has a first end secured to the first prong via a first rivet and a second end secured to the second prong via a second rivet. The roller is configured to grip and secure the object to the mounting bracket.

In some embodiments, the roller spans the entire gap between the first prong and the second prong.

In some embodiments, the roller is formed of a rubber material.

In some embodiments, a stopper is removably secured to the body. The stopper is configured to further grip the object secured to the mounting bracket.

In some embodiments, the stopper includes a central hole passing therethrough and is configured to be aligned with the first mounting hole of the body.

In some embodiments, the central hole has an upper diameter in an upper portion of the stopper and a lower diameter in a lower portion of the stopper. The upper diameter is greater than the lower diameter such that the lower portion is configured to be secured to the body via a fastener.

In some embodiments, the upper portion is formed of a rubber material and the lower portion is formed of a metal material.

In some embodiments, the stopper includes an elongated trench and a ring washer that is located in the elongated trench. The central hole is located in the elongated trench and is aligned with the ring washer.

According to another embodiment of the present technology, a method of mounting an object to a structure is provided. The method includes providing a mounting bracket. The mounting bracket includes a body that has a first end, a second end opposite the first end, and a first mounting hole that passes through the body and is located between the first end and the second end. A first resilient wing is located at the first end of the body. A second resilient wing is located at the second end of the body. A tab protrudes from a first edge of the body. The tab is located between the first end of the body and the second end of the body. A second mounting hole passes through the tab. The first resilient wing and the second resilient wing each extend upward from the body and are biased toward each other such that the first resilient wing and the second resilient wing are configured to grip and secure an object to the mounting bracket. The method includes positioning the mounting bracket on the structure; inserting a first fastener through the first mounting hole and into the structure to partially secure the mounting bracket to the structure; inserting the object between the first resilient wing and the second resilient wing; rotating the mounting bracket about the first fastener to position the object in a desired orientation; removing the object from the first resilient wing and the second resilient wing; inserting a second fastener through the second mounting hole and into the structure to fully secure the mounting bracket to the structure; and reinserting the object between the first resilient wing and the second resilient wing to secure the object to the mounting bracket.

In some embodiments, the method includes providing a stopper including an upper portion, a lower portion, and a central hole pass through the upper portion and the lower portion, the central hole has an upper diameter in the upper portion and a lower diameter in the lower portion, the upper diameter is greater than the lower diameter, the lower diameter is equal to a diameter of the first mounting hole of the body; aligning the central hole of the stopper with the first mounting hole of the body; and inserting the first fastener through the central hole of the stopper and the first mounting hole and into the structure to secure the stopper to the body and to partially secure the mounting bracket to the structure.

In some embodiments, the upper portion of the stopper is formed of a rubber material configured to further grip the object secured to the mounting bracket.

In some embodiments, the method includes providing a stopper including a central hole passing therethrough, an elongated trench, and a ring washer located in the elongated trench, the central hole is located in the elongated trench and is aligned with the ring washer; aligning the central hole of the stopper with the first mounting hole of the body; and inserting the first fastener through the ring washer of the stopper, the central hole of the stopper, and the first mounting hole and into the structure to secure the stopper to the body and to partially secure the mounting bracket to the structure.

In some embodiments, the first mounting hole is centrally located in the body.

In some embodiments, the second mounting hole is centrally located between the first end of the body and the second end of the body.

In some embodiments, the first mounting hole and the second mounting hole are aligned along a longitudinal axis of the body.

In some embodiments, each of the first resilient wing and the second resilient wing includes a base, a first prong extending from a first edge of the base, a second prong extending from a second edge of the base, an axle secured to the first prong and the second prong, and a roller supported by the axle. The first prong and the second prong oppose each other forming a gap therebetween. The axle has a first end secured to the first prong via a first rivet and a second end secured to the second prong via a second rivet. The roller is configured to grip and secure the object to the mounting bracket.

In some embodiments, the roller spans the entire gap between the first prong and the second prong.

In some embodiments, the roller is formed of a rubber material.

Further objects, aspects, features, and embodiments of the present technology will be apparent from the drawing Figures and below description.

DETAILED DESCRIPTION

Figure 1:
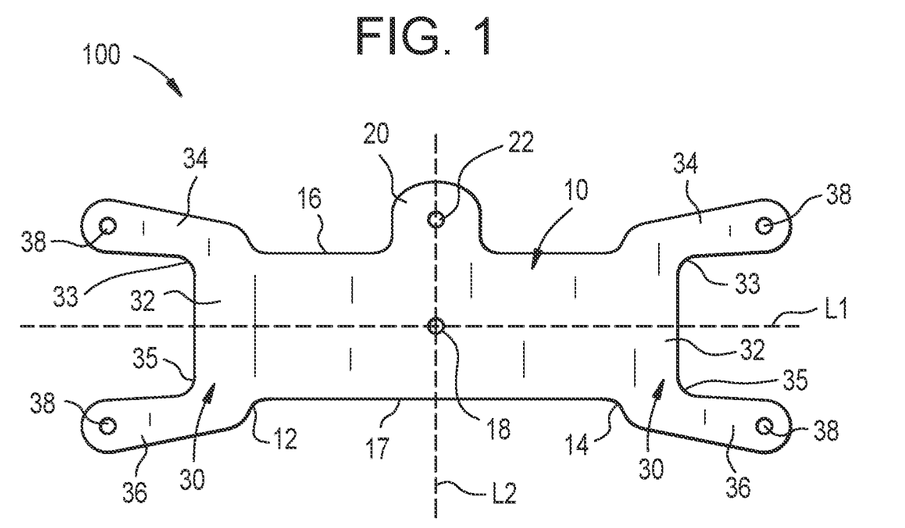
FIG. 1 is a top view of a mounting bracket according to an exemplary embodiment of the present technology shown before undergoing a stamping process.

As shown in FIG. 1, a mounting bracket for mounting an object to a structure is generally designated by the numeral 100. The mounting bracket 100 includes a body 10 that has a first end 12 and a second end 14 that is opposite the first end 12 along a latitudinal axis L1 of the body 10. A first mounting hole 18 for mounting the mounting bracket 100 to a structure passes through the body 10. In some embodiments, the first mounting hole 18 is centrally located in the body 10, such as at the intersection of the latitudinal axis L1 and a longitudinal axis L2 of the body 10, as shown in FIG. 1. In some embodiments, the first mounting hole 18 is located along the latitudinal axis L1. In some embodiments, the first mounting hole 18 is located along the longitudinal axis L2. In some embodiments, the first mounting hole 18 is located along neither the latitudinal axis L1 nor the longitudinal axis L2.

As shown in FIG. 1, the mounting bracket 100 includes a tab 20 that protrudes from a first edge 16 of the body 10 and is located between the first end 12 and the second end 14 of the body 10. The tab 20 has a second mounting hole 22 passing therethrough. In some embodiments, the second mounting hole 22 is located along the longitudinal axis L2 such that the second mounting hole 22 is centrally located between the first end 12 and the second end 14 of the body 10. In some embodiments, the second mounting hole 22 is aligned with the first mounting hole 18 along a plane that is perpendicular to the latitudinal axis L1. In some embodiments, the second mounting hole 22 is aligned with the first mounting hole 18 along the longitudinal axis L2. Although the embodiment shown in FIG. 1 has one tab 20 located on the first edge 16 of the body 10, the present technology is not limited in this regard and contemplates embodiments having more than one tab 20 located on the first edge 16 of the body 10, one or more tabs 20 located on a second edge 17 of the body 10, or combinations thereof. While the tab 20 that is illustrated in the Figures has a curved edge, it is contemplated that the present technology is not limited in this regard and the shape and style of the edge of the tab 20 can be curved, flat, triangular, or another shape.

As shown in FIG. 1, a wing 30 is located at each of the first end 12 and the second end 14 of the body 10. Each wing 30 has a base 32, a first prong 34 extending from a first edge 33 of the base 32, and a second prong 36 extending from a second edge 35 of the base 32. Each of the first prong 34 and the second prong 36 has a hole 38 passing therethrough.

In some embodiments, the body 10, tab 20, and wings 30 are one piece formed of a material. In one embodiment, the material is plastic. In one embodiment, the material is a metal material. In one embodiment, the material is a combination of metal and plastic. In some embodiments, the metal material is a spring steel. The embodiment shown in FIG. 1 shows the body 10, tab 20, and wings 30 as one sheet of flat spring steel before undergoing a stamping process. FIGS. 2-5 show the mounting bracket of FIG. 1 after undergoing a stamping process to bend the wings 30 upward away from the body 10 and inward toward each other. The stamping process also includes bending the first prong 34 and the second prong 36 of each wing 30 inwards such that the holes 38 are aligned with and facing each other. After the stamping process, the wings 30 are resilient with a bias toward each other such that the wings 30 are configured to grip and secure an object to the mounting bracket 100. Although the embodiments shown in the Figures have the body 10, tab 20, and wings as one piece, the present technology is not limited in this regard and contemplates embodiments having the body 10, tab 20, and wings 30 being separate components that are formed together by any means known in the art (e.g., welding, soldering, brazing, fusing, etc.) provided that the resulting wings 30 are resilient with a bias toward each other.

Figure 2:
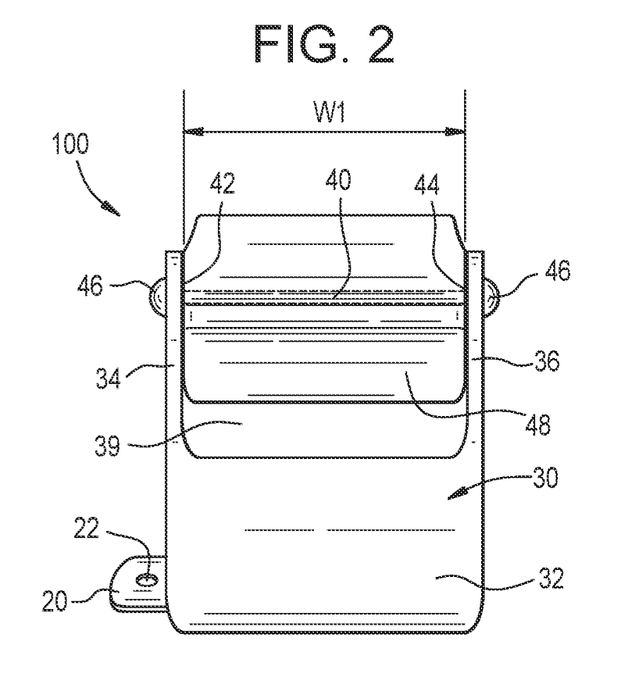
FIG. 2 is a side view of the mounting bracket of FIG. 1 after undergoing a stamping process.
Figure 3:
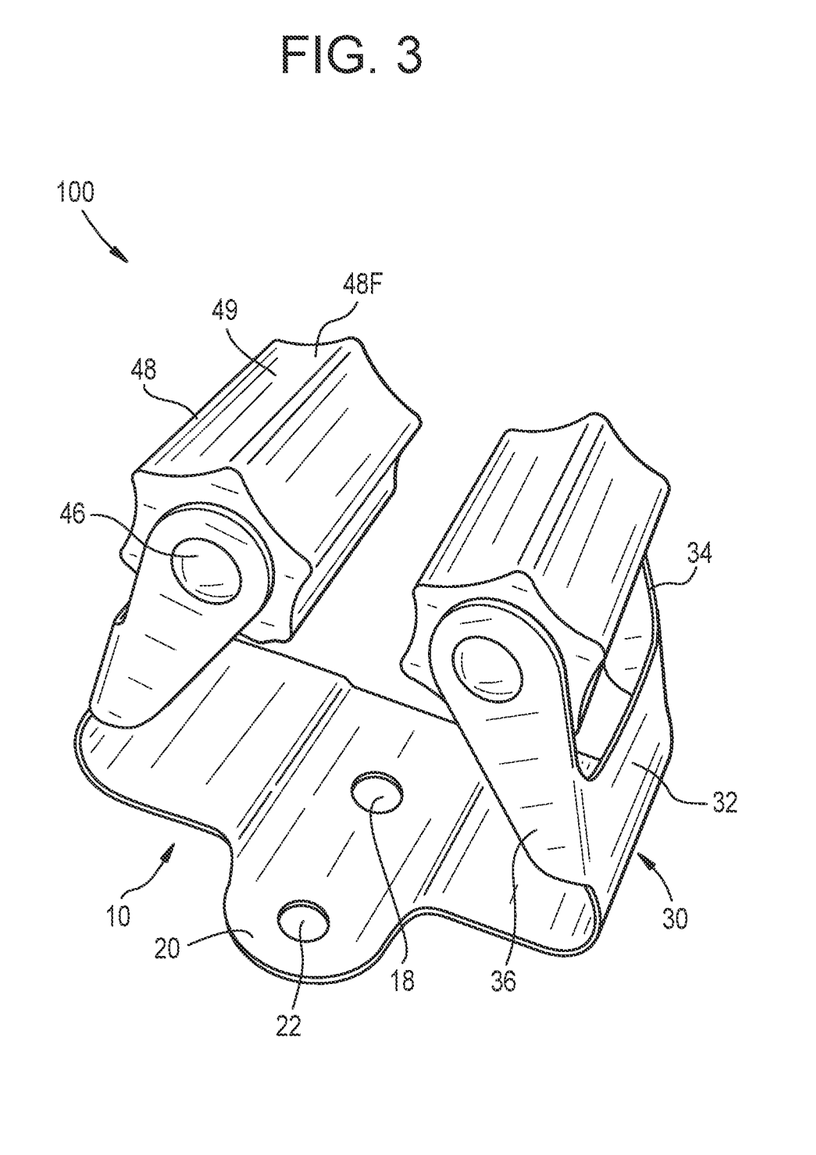
FIG. 3 is an isometric view of the mounting bracket of FIG. 2.
Figure 4:
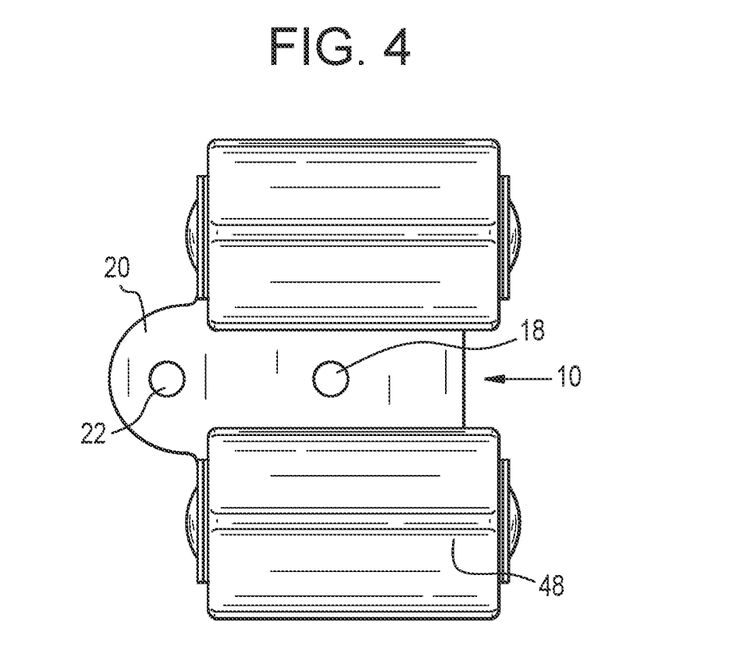
FIG. 4 is a top view of the mounting bracket of FIG. 3.
Figure 5:
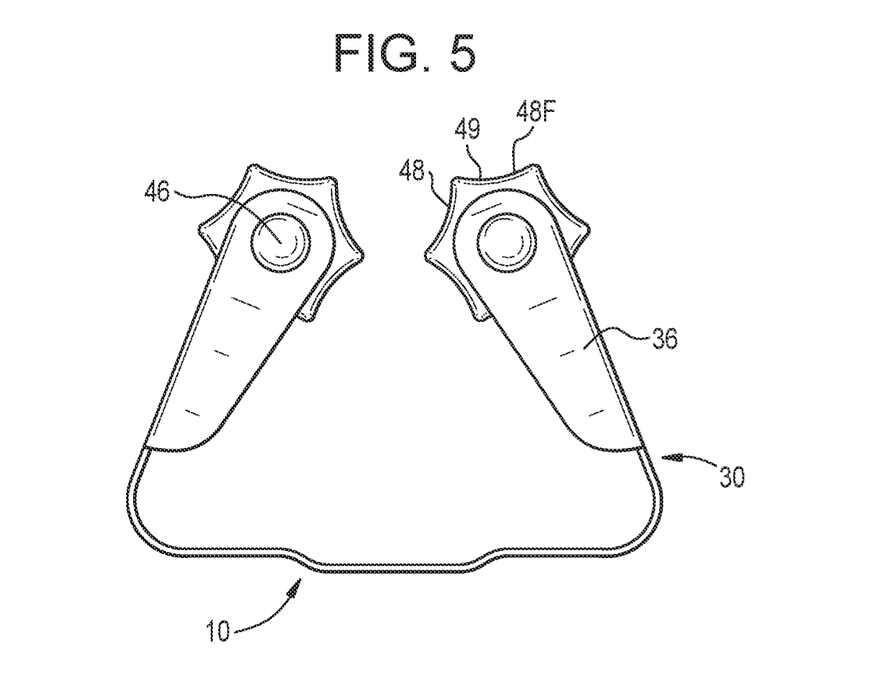
FIG. 5 is a front view of the mounting bracket of FIG. 3.

As shown in FIG. 2, the first prong 34 and the second prong 36 of the wing 30 oppose each other across a gap 39 that has a width W1. In some embodiments, an axle 40 is secured to the wing 30. The axle 40 has a first end 42 that is secured to the first prong 34 and a second end 44 that is secured to the second prong 36. In some embodiments, the first end 42 is secured to the first prong 34 and the second end 44 is secured to the second prong 36 via rivets 46 inserted through the holes 38 of the first prong 34 and the second prong 36. The axle 40 supports a roller 48 that is configured to grip and secure an object to the mounting bracket 100. In some embodiments, the roller 48 has a length that is equal to the width W1 of the gap 39 such that the roller 48 spans the entire gap 39. In some embodiments, the roller 48 is formed of a translucent or transparent material such that the roller 48 does not cover or conceal the object to be secured to the mounting bracket 100. In some embodiments, the roller 48 is formed of a rubber material. As shown in FIGS. 3-5, in some embodiments, the roller 48 has a generally hexagonal cross-section with each face 48F of the roller 48 having a longitudinal depression 49 formed therein, which further facilitates gripping an object to be secured to the mounting bracket 100. However, the present technology is not limited in this regard and contemplates embodiments where the roller 48 has differently shaped cross-sections, such as cylindrical, triangular, quadrilateral, pentagonal, octagonal, etc., with or without the longitudinal depressions 49.

Figure 6:
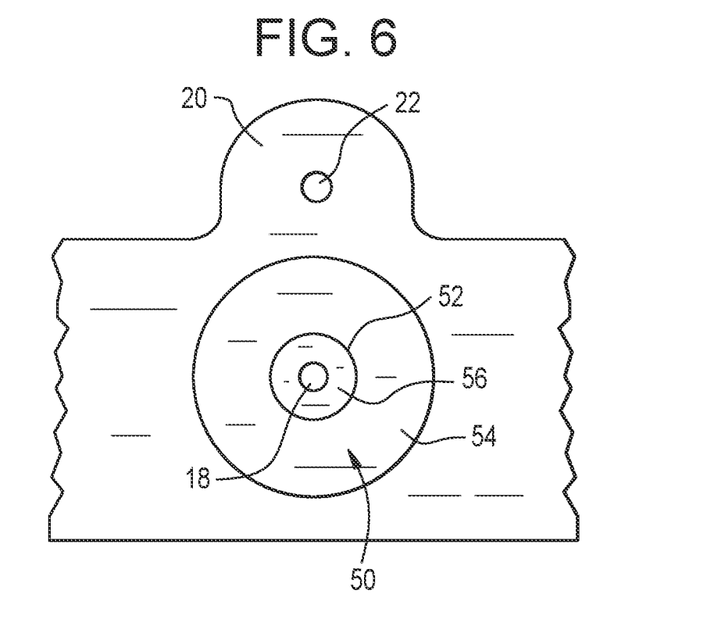
FIG. 6 is an enlarged top view of the mounting bracket of FIG. 3 having a stopper aligned over the first mounting hole according to an exemplary embodiment of the present technology.
Figure 7:
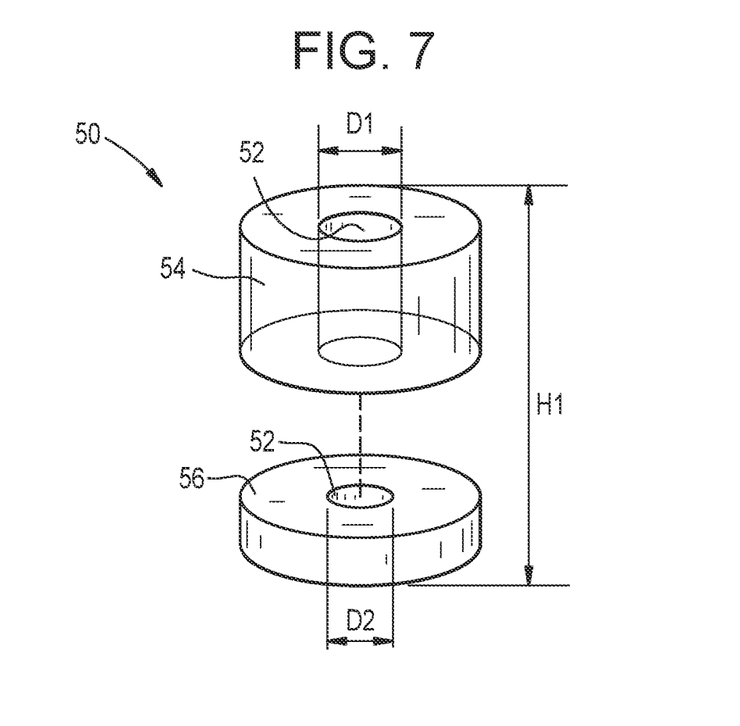
FIG. 7 is an exploded view of the stopper of FIG. 6.

As shown in FIG. 6, in some embodiments, the mounting bracket 100 includes a stopper 50 that is removably securable to the body 10. The stopper 50 is configured to further grip and secure an object to the mounting bracket 100. The stopper 50 has a central hole 52 extending therethrough such that the stopper 50 is configured to be positioned on the body 10 with the central hole 52 aligned with the first mounting hole 18. As shown in FIG. 7, in some embodiments, the stopper 50 has an upper portion 54 and a lower portion 56. The central hole 52 passes through the upper portion 54 and the lower portion 56. The central hole 52 has an upper diameter D1 in the upper portion 54 and a lower diameter D2 in the lower portion 56. The upper diameter D1 is greater than the lower diameter D2 such that the stopper 50 is removably securable to the body 10 by a fastener. Preferably, the lower diameter D2 is about equal to the diameter of the first mounting hole 18 such that the stopper 10 is removably securable to the body 10 by the same fastener that is used to mount the mounting bracket 100 to a structure 80, as described in more detail below.

In some embodiments, the upper portion 54 and the lower portion 56 are separate components formed of different materials. In some embodiments, the upper portion 54 is formed of a rubber material and the lower portion 56 is formed of a metal material (e.g., a metal ring washer or a metal rectangular plate). In some embodiments, the upper portion 54 is secured to the lower portion 56 via an adhesive. As shown in FIG. 7, the stopper 50 has an overall height H1. In some embodiments, the height H1 is three-fourth of an inch (about 19.1 mm). In some embodiments, the height H1 is five-eighth of an inch (about 15.9 mm). In some embodiments, the height H1 is one-half of an inch (about 12.7 mm). In some embodiments, the height H1 is three-sixteenth of an inch (about 4.8 mm). In some embodiments, the height H1 is one-eighth of an inch (about 3.2 mm). In some embodiments, a plurality of differently sized stoppers 50 are available such that a user can interchange the stoppers 50 to accommodate a variety of differently sized objects to be secured to the mounting bracket 100. In the embodiment shown in FIGS. 6-7, the stopper 50 has a cylindrical cross-section. However, the present technology is not limited in this regard and contemplates embodiments where the stopper 50 has a differently shaped cross-section, such as triangular, quadrilateral, pentagonal, hexagonal, octagonal, etc.

Figure 8A:
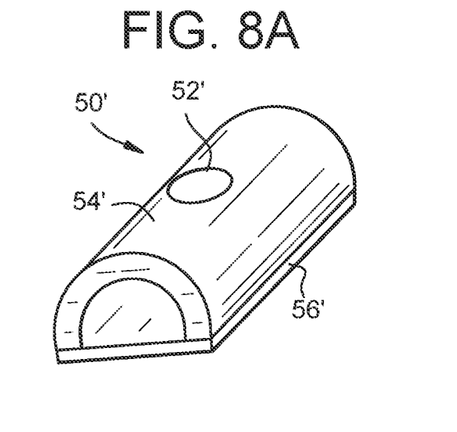
FIG. 8A is an isometric view of a stopper according to an exemplary embodiment of the present technology.
Figure 8B:
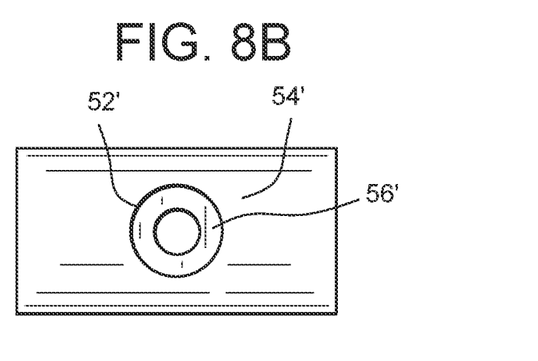
FIG. 8B is a top view of the stopper of FIG. 8A.
Figure 9A:
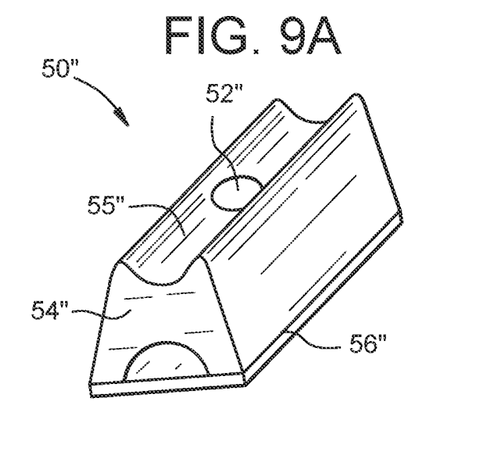
FIG. 9A is an isometric view of a stopper according to an exemplary embodiment of the present technology.
Figure 9B:
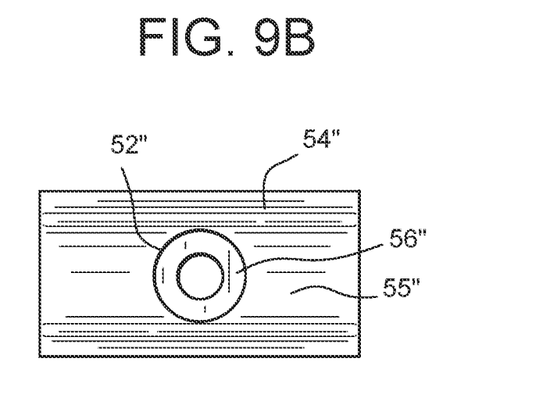
FIG. 9B is a top view of the stopper of FIG. 9A.

In some embodiments, the upper portion 54 and the lower portion 56 have different shapes. For example, FIGS. 8A-8B show a stopper 50' having an upper portion 54', a lower portion 56', and a central hole 52' passing therethrough, and FIGS. 9A-9B show a stopper 50" having an upper portion 54", a lower portion 56", and a central hole 52" passing therethrough. In the embodiment shown in FIGS. 8A-8B, the upper portion 54' has an arch shape and the lower portion 56' has a rectangular shape. In the embodiment shown in FIGS. 9A-9B, the upper portion 54" has a generally arch shape with a top elongated channel 55" therein, and the lower portion 56" has a rectangular shape.

Figure 10A:
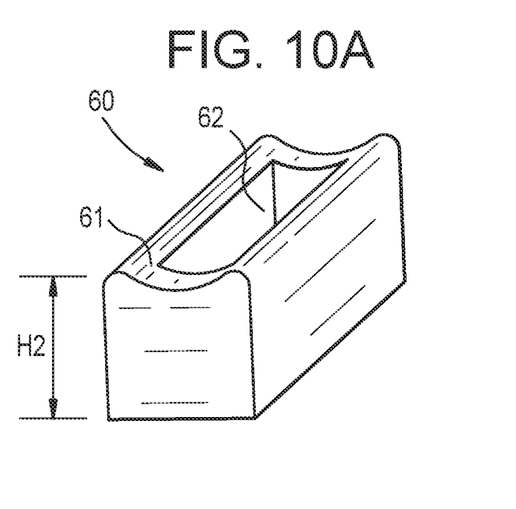
FIG. 10A is an isometric view of a stopper according to an exemplary embodiment of the present technology.
Figure 10B:
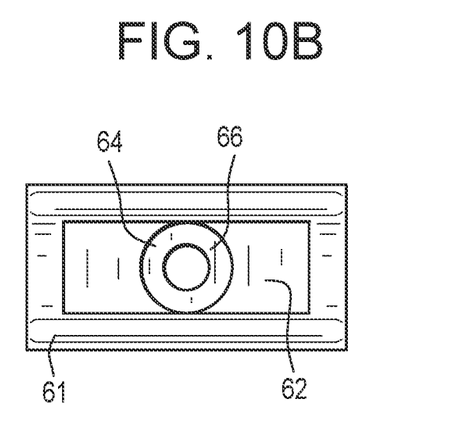
FIG. 10B is a top view of the stopper of FIG. 10A.

FIGS. 10A-10B show a stopper 60 according to another exemplary embodiment of the present technology. The stopper 60 is removably securable to the body 10 of the mounting bracket 100 and is configured to further grip and secure an object to the mounting bracket 100. The stopper 60 has an elongated trench 62 therein and a central hole 64 passing therethrough. A ring washer 66 is positioned in the elongated trench 62 and aligned with the central hole 64 such that the ring washer 66 is configured to engage the same fastener that is used to mount the mounting bracket 100 to a structure 80, as described in more detail below. In some embodiments, the stopper 60 is formed of a rubber material and the ring washer 66 is formed of a metal material. In some embodiments, the stopper 60 has a rectangular cross-section. In some embodiments, the stopper 60 has a trapezoidal cross-section. In some embodiments, a top surface 61 of the stopper 60 has a generally concave shape. The stopper 60 has an overall height H2. In some embodiments, the height H2 is three-fourth of an inch (about 19.1 mm). In some embodiments, the height H2 is five-eighth of an inch (about 15.9 mm). In some embodiments, the height H2 is one-half of an inch (about 12.7 mm). In some embodiments, the height H2 is three-sixteenth of an inch (about 4.8 mm). In some embodiments, the height H2 is one-eighth of an inch (about 3.2 mm). In some embodiments, a plurality of differently sized stoppers 60 are available such that a user can interchange the stoppers 60 to accommodate a variety of differently sized objects to be secured to the mounting bracket 100.

Figure 11:
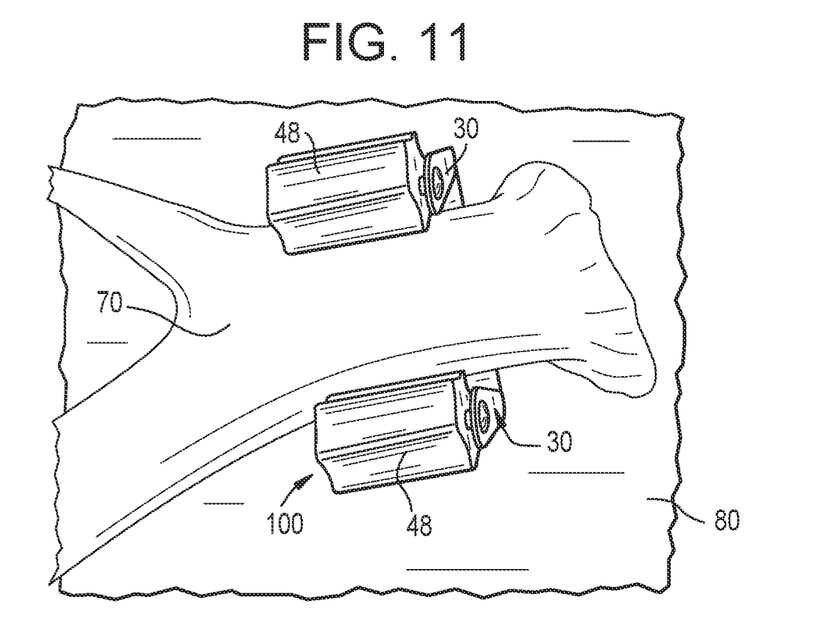
FIG. 11 is an isometric view of the mounting bracket of FIG. 3 in use mounting an object to a structure.
Figure 12:
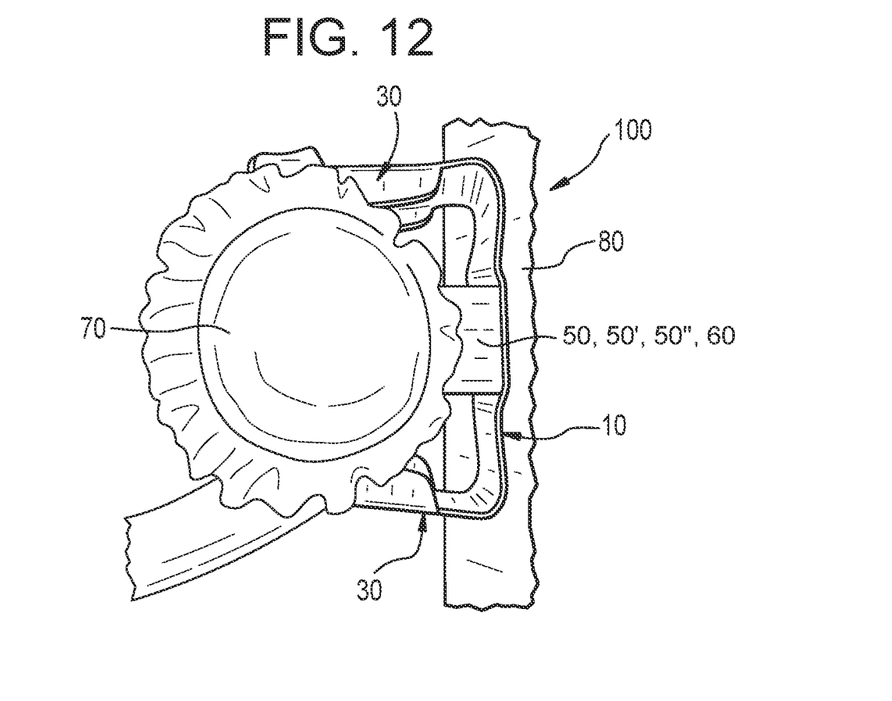
FIG. 12 is a side view of the mounting bracket of FIG. 3 in use mounting an object to a structure.
Figure 13:
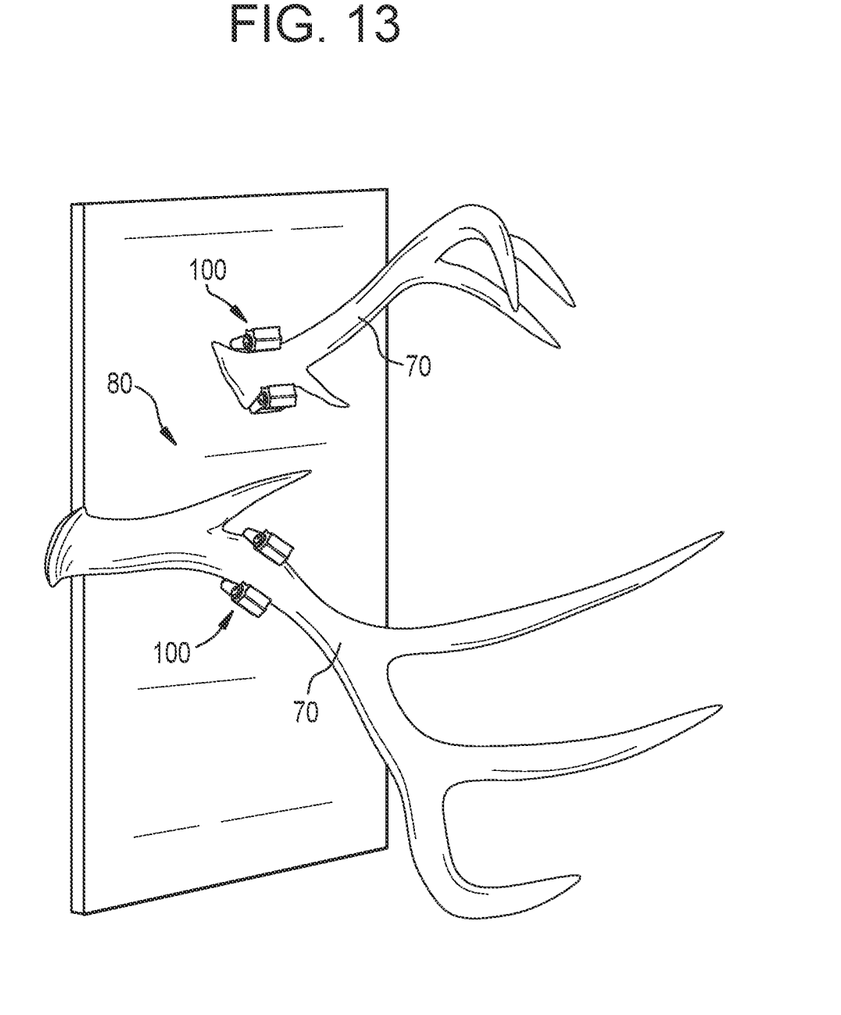
FIG. 13 is an isometric view of two mounting brackets of FIG. 3 in use mounting two objects to a structure at different orientations.

FIGS. 11-13 show exemplary embodiments of the mounting bracket 100 used to mount an object 70 to a structure 80. In some embodiments, the structure 80 is a wall. In other embodiments, the structure 80 is a plaque, a mounting board, or a frame. The body 10 is mounted to the structure 80, and the object 70 is retained by the wings 30. As shown in FIG. 11, the object 70 is gripped on opposing sides by the respective rollers 48 of the opposing wings 30. As shown in FIG. 12, the object 70 is further gripped on a third side by the stopper 50, 50', 50", Preferably, the rollers 48 and the stopper 50, 50', 50", 60 provide a sufficient coefficient of friction, and the inward bias of the wings 30 provide a sufficient compressive force such that the object 70 is securely retained within the mounting bracket 100 regardless of the object's orientation on the structure 80, as shown in FIG. 13. In some embodiments, the object 70 has an irregular shape. For example, as shown in FIGS. 11-13, the objects 70 mounted to the structure are animal antlers (e.g., deer antlers, elk antlers, moose antlers, etc.). In some embodiments, the object 70 has a regular shape, such as the smooth, cylindrical shape of the handle/shaft of a tool (e.g., broom, mop, brush, shovel, rake, etc.). In some embodiments, the mounting bracket 100 is colored to match or aesthetically blend with the color of the object 70 and/or the color of the structure 80.

Figure 14:
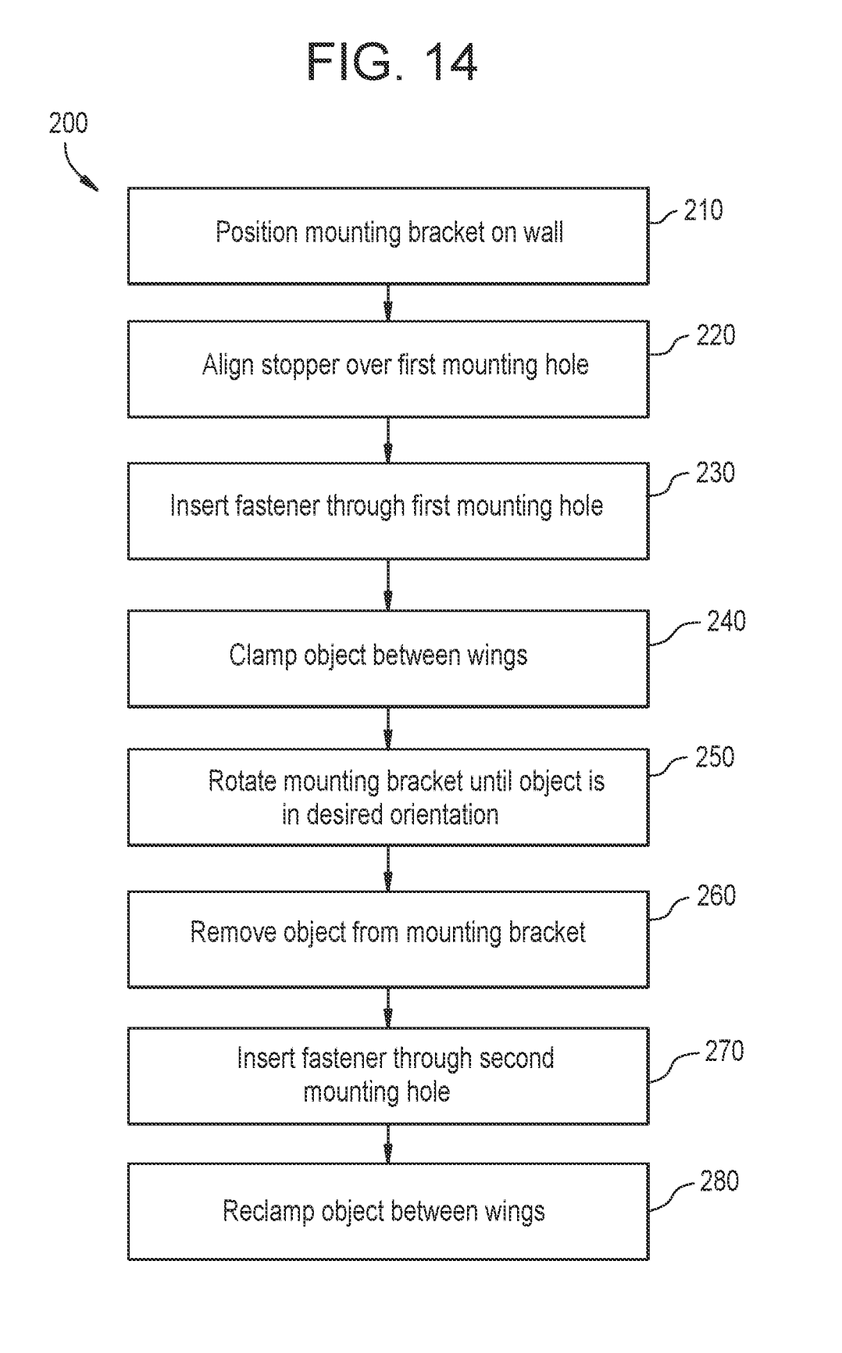
FIG. 14 is a flowchart showing the steps of mounting an object to a structure using a mounting bracket according to an exemplary embodiment of the present technology.

As shown in FIG. 14, a method for mounting an object to a structure is generally designated by the numeral 200. At step 210, the method 200 includes positioning the mounting bracket 100 described above on a structure 80. At step 230, the method 200 includes inserting a first fastener (e.g., screw, nail, bolt, rivet, etc.) through the first mounting hole 18 of the mounting bracket 100 and into the structure 80 to partially secure the mounting bracket 100 to the structure 80. As used herein, the term "partially secure the mounting bracket to the structure" means that the mounting bracket is attached to the structure by only one fastener such that the mounting bracket can be rotated or pivoted about the fastener. In some embodiments, the first fastener is a screw and step 230 further includes pre-drilling a hole in the structure 80 for the screw.

In some embodiments, the mounting bracket 100 includes the stopper 50, 50', 50", 60 described above and the method 200 includes the step 220 of aligning the central hole 52, 52', 52", 64 of the stopper 50, 50', 50", 60 with the first mounting hole 18 of the mounting bracket 100. In such embodiments, step 230 further includes inserting the first fastener through the central hole 52, 52', 52", 64 of the stopper 50, 50', 50", 60, through the first mounting hole 18 of the mounting bracket 100, and into the structure 80 to partially secure the mounting bracket 100 to the structure 80. It is contemplated that in some embodiments, the stopper 50, 50', 50", 60 is not included or used with the mounting bracket 100.

At step 240, the method 200 includes inserting an object 70 between the opposing wings 30 of the mounting bracket 100. A user inserts the object 70 between the wings 30 by flexing one or both of the wings 30 outward to further separate the wings 30 from each other, positioning the object 70 between the wings 30, and compressing the wings 30 back to their original biased position to grip or clamp the object 70. In some embodiments, the object 70 is press fit between the wings 30. In embodiments where the mounting bracket 100 includes the stopper 50, 50', 50", 60, the object 70 is preferably positioned such that it abuts the stopper 50, 50', 50", 60 while also being griped by the wings 30.

At step 250, the method 200 includes rotating or pivoting the mounting bracket 100 about the first fastener to position the object 70 in a desired orientation. For example, FIG. 13 shows two objects 70 (antlers) mounted to a structure 80 via mounting brackets 100 in different orientations. At step 260, the method 200 includes removing the object 70 from the mounting bracket 100 by preferably reversing the insertion processes described above regarding step 240.

At step 270, the method 200 includes inserting a second fastener (e.g., screw, nail, bolt, rivet, etc.) through the second mounting hole 22 of the mounting bracket 100 and into the structure 80 to fully secure the mounting bracket 100 to the structure 80. As used herein, the term "fully secure the mounting bracket to the structure" means that the mounting bracket is attached to the structure by more than one fastener such that the mounting bracket cannot be rotated or pivoted about any fastener. In some embodiments, the second fastener is a screw and step 270 further includes pre-drilling a hole in the structure 80 for the screw. At step 280, the method 200 includes reinserting the object 70 between the opposing wings 30 of the mounting bracket 100 to secure the object 70 to the mounting bracket 100. Preferably, the object 70 is reinserted by the same processes described above regarding step 240.

Accordingly, embodiments of the present technology disclosed herein are directed to a mounting bracket for mounting an animal antler to a structure that addresses the problems described above. The mounting bracket firmly grips variously sized and shaped antlers without drilling into or damaging the antler. For example, the mounting bracket can grip the base of the antler, the section of main beam between the G1 and G2 portions of the antler, or one of the tines of the antler. The mounting bracket permits the antler to be efficiently inserted into and removed from the bracket. The mounting bracket permits the antler to be displayed in a wide range of angles and orientations, without covering or concealing any part of the antler. Thus, the mounting bracket can be used to display a deer's left antler, right antler, or both as a set at orientations that match how the antlers originally sat on the deer's head. The mounting bracket is also colored to aesthetically match the color of the antler and/or the structure on which the antler is to be mounted.

As will be apparent to those skilled in the art, various modifications, adaptations, and variations of the foregoing specific disclosure can be made without departing from the scope of the invention claimed herein. The various features and elements of the invention described herein may be combined in a manner different than the specific examples described or claimed herein without departing from the scope of the invention. In other words, any element or feature may be combined with any other element or feature in different embodiments, unless there is an obvious or inherent incompatibility between the two, or it is specifically excluded.

References in the specification to "one embodiment," "an embodiment," etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such aspect, feature, structure, or characteristic with other embodiments, whether or not explicitly described.

The singular forms "a," "an," and "the" include plural reference unless the context clearly dictates otherwise. Thus, for example, a reference to "a plant" includes a plurality of such plants. It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition, or step being referred to is an optional (not required) feature of the invention.

The term "and/or" means any one of the items, any combination of the items, or all of the items with which this term is associated. The phrase "one or more" is readily understood by one of skill in the art, particularly when read in context of its usage.

Each numerical or measured value in this specification is modified by the term "about." The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

The terms "longitudinal" and "latitudinal" as used herein are for naming purposes and are for the convenience of understanding the direction and location of certain elements described herein. The terms "longitudinal" and "latitudinal" are not meant to be limiting to any one orientation of the invention or element or feature of the invention.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range (e.g., weight percents of carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third, and upper third, etc.

As will also be understood by one skilled in the art, all language such as "up to," "at least," "greater than," "less than," "more than," "or more," and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, as used in an explicit negative limitation.

What is claimed is:

1. A mounting bracket comprising:
    a body having a first end, a second end opposite the first end, and a first mounting hole passing therethrough and located between the first end and the second end;
    a first resilient wing located at the first end of the body;
    a second resilient wing located at the second end of the body;
    a tab protruding from a first edge of the body and located between the first end and the second end, the tab having a second mounting hole passing therethrough; and
    a stopper removably secured to the body, the stopper is configured to grip an object secured to the mounting bracket, the stopper comprising a central hole that passes therethrough and is configured to be aligned with the first mounting hole of the body, the central hole has an upper diameter in an upper portion of the stopper and a lower diameter in a lower portion of the stopper, the upper diameter is greater than the lower diameter such that the lower portion is configured to be secured to the body via a fastener used to mount the mounting bracket to a structure;
    wherein the first resilient wing and the second resilient wing each extend upward from the body and are biased toward each other such that the first resilient wing and the second resilient wing are configured to grip and secure the object to the mounting bracket.

2. The mounting bracket of claim 1, wherein the first mounting hole is centrally located in the body.

3. The mounting bracket of claim 1, wherein the second mounting hole is centrally located between the first end of the body and the second end of the body.

4. The mounting bracket of claim 1, wherein the first mounting hole and the second mounting hole are aligned along a longitudinal axis of the body.

5. The mounting bracket of claim 1, wherein each of the first resilient wing and the second resilient wing comprises:
a base;
a first prong extending from a first edge of the base;
a second prong extending from a second edge of the base and opposing the first prong thereby forming a gap between the first prong and the second prong;
an axle having a first end secured to the first prong via a first rivet and a second end secured to the second prong via a second rivet; and
a roller supported by the axle, the roller is configured to grip and secure the object to the mounting bracket.

6. The mounting bracket of claim 5, wherein the roller is formed of a rubber material.

7. The mounting bracket of claim 1, wherein the upper portion is formed of a rubber material and the lower portion is formed of a metal material.

8. The mounting bracket of claim 1, wherein the upper portion of the stopper has an elongated channel in a top surface thereof, and the lower portion of the stopper has a rectangular shape.

9. The mounting bracket of claim 1, wherein the upper portion of the stopper has an arch shape, and the lower portion of the stopper has a rectangular shape.

10. The mounting bracket of claim 1, wherein the upper portion of the stopper and the lower portion of the stopper each have a cylindrical shape.

11. A method of mounting an object to a structure, the method comprising:
providing a mounting bracket comprising:
a body having a first end, a second end opposite the first end, and a first mounting hole passing therethrough and located between the first end and the second end;
a first resilient wing located at the first end of the body;
a second resilient wing located at the second end of the body; and
a tab protruding from a first edge of the body and located between the first end and the second end, the tab having a second mounting hole passing therethrough;
wherein the first resilient wing and the second resilient wing each extend upward from the body and are biased toward each other such that the first resilient wing and the second resilient wing are configured to grip and secure the object to the mounting bracket;
providing a stopper comprising an upper portion, a lower portion, and a central hole passing through the upper portion and the lower portion, the central hole has an upper diameter in the upper portion and a lower diameter in the lower portion, the upper diameter is greater than the lower diameter, the lower diameter is equal to a diameter of the first mounting hole of the body;
aligning the central hole of the stopper with the first mounting hole of the body;
positioning the mounting bracket on the structure;
inserting a first fastener through the central hole of the stopper and the first mounting hole and into the structure to secure the stopper to the body and to partially secure the mounting bracket to the structure;
inserting the object between the first resilient wing and the second resilient wing;
rotating the mounting bracket about the first fastener to position the object in a desired orientation;
removing the object from the first resilient wing and the second resilient wing;
inserting a second fastener through the second mounting hole and into the structure to fully secure the mounting bracket to the structure; and
reinserting the object between the first resilient wing and the second resilient wing to secure the object to the mounting bracket.

12. The method of claim 11, wherein the first mounting hole is centrally located in the body.

13. The method of claim 11, wherein the second mounting hole is centrally located between the first end of the body and the second end of the body.

14. The method of claim 11, wherein the first mounting hole and the second mounting hole are aligned along a longitudinal axis of the body.

15. The method of claim 11, wherein each of the first resilient wing and the second resilient wing comprises:
a base;
a first prong extending from a first edge of the base;
a second prong extending from a second edge of the base and opposing the first prong thereby forming a gap between the first prong and the second prong;
an axle having a first end secured to the first prong via a first rivet and a second end secured to the second prong via a second rivet; and
a roller supported by the axle, the roller is configured to grip and secure the object to the mounting bracket.

16. The method of claim 11, wherein the upper portion of the stopper has an elongated channel in a top surface thereof, and the lower portion of the stopper has a rectangular shape.

17. The method of claim 11, wherein the upper portion of the stopper has an arch shape, and the lower portion of the stopper has a rectangular shape.

18. The method of claim 11, wherein the upper portion of the stopper and the lower portion of the stopper each have a cylindrical shape.

19. A mounting bracket comprising:
a body having a first end, a second end opposite the first end, and a first mounting hole passing therethrough and located between the first end and the second end;
a first resilient wing located at the first end of the body;
a second resilient wing located at the second end of the body;
a tab protruding from a first edge of the body and located between the first end and the second end, the tab having a second mounting hole passing therethrough; and
a stopper removably secured to the body, the stopper is configured to grip an object secured to the mounting bracket, the stopper comprising a central hole that passes therethrough, an elongated trench, and a ring washer located in the elongated trench, the central hole is located in the elongated trench aligned with the ring washer and is configured to be aligned with the first mounting hole of the body such that the stopper is configured to be secured to the body via a fastener used to mount the mounting bracket to a structure;
wherein the first resilient wing and the second resilient wing each extend upward from the body and are biased toward each other such that the first resilient wing and the second resilient wing are configured to grip and secure the object to the mounting bracket.

20. The mounting bracket of claim 19, wherein each of the first resilient wing and the second resilient wing comprises:
a base;
a first prong extending from a first edge of the base;
a second prong extending from a second edge of the base and opposing the first prong thereby forming a gap between the first prong and the second prong;

an axle having a first end secured to the first prong via a first rivet and a second end secured to the second prong via a second rivet; and a roller supported by the axle, the roller is configured to grip and secure the object to the mounting bracket.

\* \* \* \* \*